United States Patent
Forstmeier et al.

(10) Patent No.: US 11,158,961 B2
(45) Date of Patent: Oct. 26, 2021

(54) METHOD FOR PRODUCING AN ELECTRICAL LINE ARRANGEMENT

(71) Applicant: LISA DRÄXLMAIER GMBH, Vilsbiburg (DE)

(72) Inventors: Christoph Forstmeier, Landshut (DE); Georg Völlner, Landshut (DE)

(73) Assignee: LISA DRAEXLMAIER GMBH, Vilsbiburg (DE)

( * ) Notice: Subject to any disclaimer, the term of this patent is extended or adjusted under 35 U.S.C. 154(b) by 73 days.

(21) Appl. No.: 16/731,815

(22) Filed: Dec. 31, 2019

(65) Prior Publication Data

US 2020/0136278 A1    Apr. 30, 2020

Related U.S. Application Data

(63) Continuation of application No. PCT/DE2018/100466, filed on May 16, 2018.

(30) Foreign Application Priority Data

Jul. 5, 2017 (DE) .................. 10 2017 114 994.5

(51) Int. Cl.
*B23K 20/12* (2006.01)
*H01R 4/62* (2006.01)
(Continued)

(52) U.S. Cl.
CPC .......... *H01R 4/625* (2013.01); *B23K 20/122* (2013.01); *B23K 20/129* (2013.01); *H01R 4/023* (2013.01);
(Continued)

(58) Field of Classification Search
None
See application file for complete search history.

(56) References Cited

U.S. PATENT DOCUMENTS

| | | | | |
|---|---|---|---|---|
| 2,806,215 A | * | 9/1957 | Redslobjeanj | ......... H01R 11/12 439/868 |
| 2,815,497 A | * | 12/1957 | Redslob | ................... H01R 4/62 439/203 |
| 3,656,092 A | * | 4/1972 | Swengel, Sr. | .......... H01R 4/029 439/730 |

(Continued)

FOREIGN PATENT DOCUMENTS

| | | |
|---|---|---|
| DE | 102013101876 | 6/2014 |
| EP | 1032077 | 8/2000 |
| EP | 2735397 | 5/2014 |

OTHER PUBLICATIONS

International Search Report for International patent application PCT/DE2018/100466, dated Jul. 6, 2018.

*Primary Examiner* — Devang R Patel
(74) *Attorney, Agent, or Firm* — Burris Law, PLLC

(57) ABSTRACT

A method for producing an electrical line arrangement with an electrical conductor and an electrical contact element to be connected thereto includes preparation of the exposed conductor, affixing of a casing open on its two front sides up to the exposed conductor, and forming of a first firmly bonded connection between the exposed conductor and an interior perimeter section of the casing by friction stir welding, by introducing a reaming tool from one front side into the casing and rotating the tool relative to the casing and to the conductor. Additionally, the method includes forming of a second firmly bonded connection between the casing and the contact element.

10 Claims, 3 Drawing Sheets

(51) Int. Cl.
*H01R 4/02* (2006.01)
*H01R 43/02* (2006.01)

(52) U.S. Cl.
CPC ......... *H01R 4/029* (2013.01); *H01R 43/0207* (2013.01)

(56) References Cited

U.S. PATENT DOCUMENTS

| | | | | |
|---|---|---|---|---|
| 3,728,781 A * | 4/1973 | Curtis | ............... | H01R 4/029 228/113 |
| 5,499,448 A * | 3/1996 | Tournier | ............... | H01R 4/183 29/862 |
| 6,538,203 B1 * | 3/2003 | Nolle | ............... | H01R 4/62 174/84 C |
| 7,374,466 B2 * | 5/2008 | Onuma | ............... | H01R 11/28 439/874 |
| 7,705,265 B2 * | 4/2010 | Asakura | ............... | H01R 43/0221 219/121.64 |
| 7,828,610 B2 * | 11/2010 | Lehmann | ............... | H01R 4/187 439/874 |
| 9,011,188 B2 * | 4/2015 | Aoki | ............... | H01R 43/0207 439/874 |
| 9,289,848 B2 * | 3/2016 | Handel | ............... | H01R 43/28 |
| 9,293,838 B2 * | 3/2016 | Sakaguchi | ............... | H01R 4/62 |
| 10,404,025 B2 | 9/2019 | Mayer et al. | | |
| 2006/0208838 A1 * | 9/2006 | Beuscher | ............... | H01R 4/625 335/78 |
| 2014/0144015 A1 * | 5/2014 | Mayer | ............... | H01R 4/20 29/860 |
| 2016/0006138 A1 | 1/2016 | Harms et al. | | |
| 2017/0018859 A1 * | 1/2017 | Drew | ............... | H01R 43/28 |

* cited by examiner

US 11,158,961 B2

METHOD FOR PRODUCING AN ELECTRICAL LINE ARRANGEMENT

CROSS-REFERENCE TO RELATED APPLICATIONS

This application is a continuation of International Application No. PCT/DE2018/100466, filed on May 16, 2018, which claims priority to and the benefit of DE 10 2017 114 994.5, filed on Jul. 5, 2017. The disclosures of the above applications are incorporated herein by reference.

FIELD

The present disclosure relates to a method for producing an electrical line arrangement with a large-area, firmly bonded connection between an electrical line and an electrical contact element attached thereto.

BACKGROUND

The statements in this section merely provide background information related to the present disclosure and may not constitute prior art.

For example, a method is known from DE 10 2013 101 876 B3 to establish a firmly bonded connection of an electrical line and/or of a cable to an electrical contact element. In this regard a bundle of individual strands of the cable is introduced via an inlet opening into a receiving casing of the contact element, wherein the receiving casing features an end piece facing away from the inlet opening. By means of a spindle introduced into the bundle, an access cavity disposed in the end piece is created, wherein the end piece featuring the access cavity is expanded. Weld energy from a welding tool in a welding process is injected via the access cavity to produce a firmly bonded connection between at least one partial number of the individual strands to the interior wall of the expanded end piece. Although with this method a large-area, firmly bonded connection is established between the cable and the contact element, it turns out that due to the one-piece design of the receiving casing and contact element, the design configuration of the contact element is restricted. In particular, the one-piece design does not allow pre-assembly of the line and receiving casing for the firmly bonded connection.

Another method for connecting of this kind of contact partners is known e.g. from EP 1 032 077 A2. In this method an insulated electrical aluminum conductor formed from a plurality of aluminum wires is connected to a contact element made of copper, a copper alloy and/or brass. To this end, the insulation of the aluminum cable is removed from the point of contact with the contact element and a support casing is applied around it. The support casing surrounds at least the region neighboring the front terminal side of the insulated portion of the aluminum conductor and is pressed onto and/or shrunken onto the aluminum line so that the aluminum wires are pressed together in the region of the front side. The contact element is then welded to the front side of the aluminum alloy formed by the individual aluminum wires. Conversely, it would be desirable to obtain a larger area and firmly bonded connection between the support casing and the aluminum alloy.

SUMMARY

The present disclosure creates the largest possible surface area for a firmly bonded connection which additionally allows a broad latitude for the design of the supplied contact element.

A method according to the present disclosure for producing an electrical line arrangement with an electrical conductor and an electrical contact element to be connected thereto comprises:

Preparation of the exposed conductor. In one form the conductor is surrounded by an insulating shell and includes a plurality of individual wires. For exposing of the conductor, the insulating shell is removed in sections, so that the individual wires are exposed and can be contacted accordingly.

In one form, a hollow, cylindrical casing open on its two front sides is affixed to the exposed conductor. The casing can be produced, for example, from a good electrically conducting material, such as copper or a copper alloy.

Forming of a first, firmly bonded connection between the exposed conductor and an interior, perimeter section of the casing by friction stir welding. For friction stir welding, a reaming tool, for example, a spindle, is inserted, at least in sections, into the casing from the front side facing the contact element being moved up, or is brought into contact at least with the free end of the conductor, that is, with a front side of the line, and is caused to rotate relative to the casing and relative to the conductor. These latter elements can be clamped in a holding tool for this purpose.

Forming of a second firmly bonded connection between the casing and the contact element. This second firmly bonded connection can also be formed in the pre-assembly of the casing, so that the casing need not necessarily already be brought up to the conductor. The contact element can be, for example, a cable lug, a plug contact, or similar.

Therefore, the line arrangement produced according to the present disclosure provides the advantage that the two firmly bonded connections are durable when exposed to mechanical stress, such as regarding the thermal expansion of the contact partners, for example, the effect of sound during ultrasound welding or vibrations during subsequent use of the line arrangements, for example in a motor vehicle. With this method, different metal pairs can be easily joined together, such as aluminum and copper and their alloys.

Due to the configuration of the casing open on both sides, it is possible that the first firmly bonded connection can be visually checked through the open front side of the casing before or after the casing is affixed to the conductor. This can be effected in the case of machine manufacturing, for example, in that a camera system is positioned such that it takes one or several pictures through the open front side which are then evaluated with regard to the quality of the first, firmly bonded connection.

It is possible that the line arrangement is partly pre-assembled. In particular, the second firmly bonded connection can be formed before affixing the casing onto the conductor. In this regard a suitable welding method can be used, for example, an ultrasound welding method or a friction stir welding method. The pre-assembly provides logistical advantages, since for example, a plurality of these semi-finished goods can be pre-manufactured and provided independently of the forming of the first firmly bonded connection.

However, it has proven to be particularly advantageous that the contact element is provided with a passageway opening for insertion of the reaming tool. Accordingly, in this case the passageway opening should have a diameter which allows for easy insertion of the reaming tool. This allows the forming of the first firmly bonded connection by friction stir welding, particularly when the contact element has already been connected to the casing via the second firmly bonded connection. Friction stir welding has proven to be useful for this kind of joining, since it can withstand mechanical stresses well.

As an alternative, the second firmly bonded connection can also be formed after affixing the casing onto the conductor. Thus, in this case, first the conductor is welded to the casing and only thereafter the contact element is welded to the casing. This provides the advantage that rejects, at least in regard to the contact element, can be avoided, since the first firmly bonded connection can be visually checked before the second firmly bonded connection is formed.

To form the second firmly bonded connection and/or to improve the weld quality between the casing and the contact element, it has proven advantageous when forming the first firmly bonded connection, to use the tool contour of the reaming tool to produce a facing on, or to make planar, a ring-shaped front surface facing the contact element being affixed. Thus, the reaming tool used for forming of the first firmly bonded connection can simultaneously also prepare the contact surface for forming of the second firmly bonded connection. Ideally a complicated process step of this kind can be omitted. In this case the reaming tool can display a centrally arranged protrusion whose diameter or width is dimensioned such that it can be introduced into the casing. To the side of or radial to the casing a profiled surface, for example, can be provided which rests against the ring-shaped front surface during insertion of the protrusion into the casing and makes the surface planar by friction, for example.

In order to obtain a low-cost and high-quality joint even in the case of hard to weld material pairs, the second firmly bonded connection can be produced by friction stir welding. To do so, the contact element or the casing can be clamped with the conductor in a clamping tool and the other contact partner can be rotated with respect thereto.

Due to the tool contour of the reaming tool for forming of the first firmly bonded connection, the first firmly bonded connection can display an inward bulged pot-shape at the front side of the casing facing the contact element being affixed. In this respect it is advantageous that the second firmly bonded connection is formed between a ring-shaped front surface of the casing and an opposing surface of the contact element. Thus, the contact element can be reamed onto the ring-shaped front surface.

In order to inhibit pushing of the braid, that is, to reduce pushing of the individual wires opposite to the casing, the casing can be pressed together, for example, radially, when being affixed onto the conductor. Thus, the conductor will be tensioned in the casing so that the reaming tool for forming of the first firmly bonded connection will not push the conductor into, or at least not too far into the casing. Before the forming of the first firmly bonded connection, the free end facing the contact element to be affixed is essentially flush against the corresponding front side of the casing.

The method has proven to be particularly advantageous when the conductor is made of aluminum or an aluminum alloy. The method is suitable in particular when mutually different metal materials are to be welded together. The contact element can then be made of copper or a copper alloy with a correspondingly good electrical conductance, but nonetheless can be attached with a high weld quality to the casing and/or to the conductor by the employed welding method.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
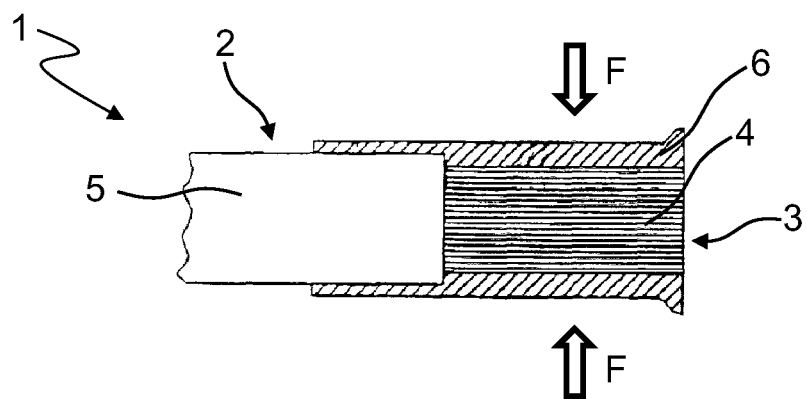
FIG. 1A is a side view of an electrical line arrangement which is produced according to a first exemplary form of the method according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1B:
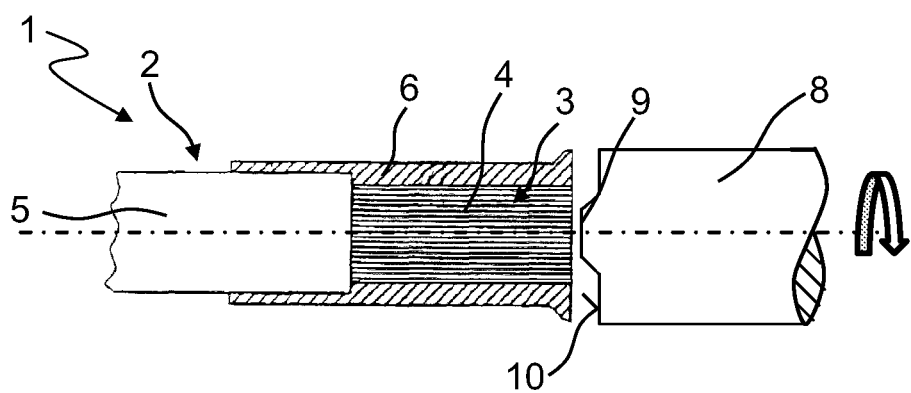
FIG. 1B is a side view of the electrical line arrangement of FIG. 1A adjacent to a reaming tool.
Figure 1C:
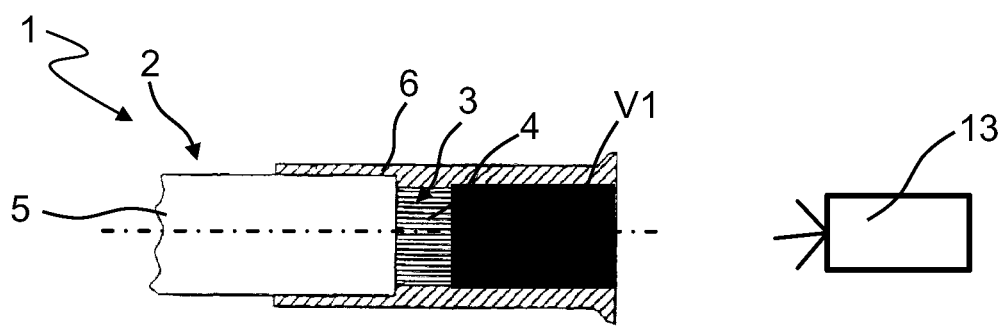
FIG. 1C is a side view of the electrical line arrangement of FIG. 1A with a firmly bonded connection adjacent to an inspection tool.

A manufacturing method for a line arrangement 1 is depicted in FIGS. 1A to 1D. The line arrangement 1 comprises an electrical line 2 with an interior electrical conductor 3, which includes a plurality of individual wires 4, and also an insulating shell 5, a casing 6 surrounding the conductor 3 and an electrical contact element 7. In FIG. 1C the conductor 3, the casing 6 and the contact element 7 are firmly bonded to each other so that the line arrangement 1 is completed.

For the method according to FIGS. 1A to 1D, first the line 2 is prepared whose conductor 3 has already been exposed in sections at one free end by a removal of the insulating shell 5. The conductor 3 here is an aluminum or an aluminum alloy material, for example. Then, as is indicated in FIG. 1A, the casing 6 is pushed onto the exposed conductor 3, wherein the casing 6 extends up to over the insulating shell 5 to provide a sturdy attachment to the line 2 and (potentially) to form a tension relief.

As is indicated by two arrows in FIG. 1A, the casing 6, which is designed here as being a hollow cylinder with two open front sides is pressed in an additional step with the radially directed force F indicated as an example here. The casing 6 is pressed using a compressing tool (not illustrated), onto the conductor 3 and if desired, onto the insulating shell 5. Thus, any pushing of the braid and/or dislocation of the individual wires 4 is inhibited. During the compression, the casing 6 is plastically deformed and is held against the conductor 3 in a force-fitted and positive-interlocking manner.

Then as illustrated in FIG. 1B, a pin- or spindle-like reaming tool 8 for friction stir welding of a front side of the casing 6 facing away from the line 2 is moved up to the casing 6. In this exemplary form, the reaming tool 8 includes a tool contour which has a centrally positioned protrusion 9 which is surrounded by a profiled, ring-shaped reaming surface 10. Together with or after the movement, the reaming tool 8 is driven to rotate about its longitudinal axis relative to the conductor 3 and to the casing 6, as is indicated by an arrow in FIG. 1B. In particular, the protrusion 9 then melts the material of the conductor 3 in sections and this plasticized material bonds with the interior perimeter of the casing 6. The reaming surface 10 simultaneously processes the ring-shaped front side of the casing 6 and makes it planar. Due to this friction stir welding a first firmly bonded connection V1 (FIG. 1C) is formed between the conductor 3 and/or its individual wires 4 and the casing 6 and securely joins them together.

FIG. 1C depicts the first firmly bonded connection V1. The reaming tool 8 is again removed from the conductor 3 and the casing 6. Thus, a test apparatus 13 can be set up so that it can be used to inspect, for example, visually, the first firmly bonded connection V1.

After creating the first firmly bonded connection V1, its weld quality can now be checked through the open front side of the casing 6 and the test apparatus 13 designed here as a camera is used. Due to this inspection, a high quality of the line arrangement 1 can be provided since the firmly bonded connection V1 can be accurately checked.

Figure 1D:
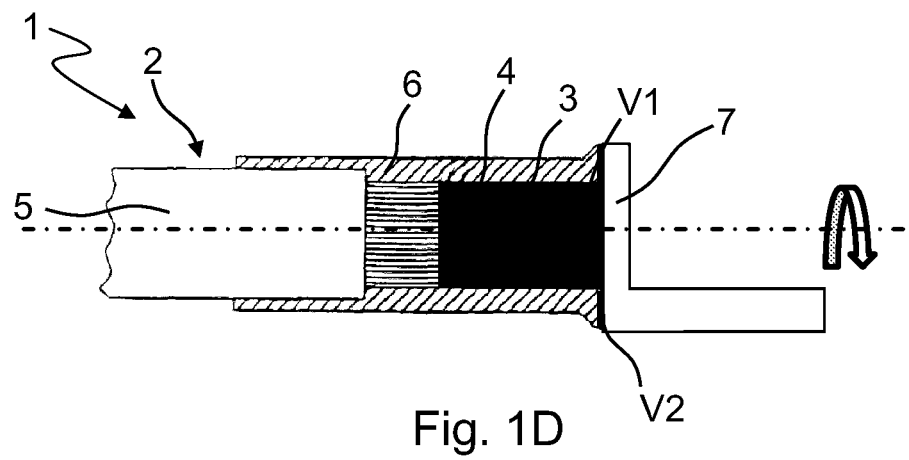
FIG. 1D is a side view of the electrical line arrangement of FIG. 1C firmly bonded to a contact element.

As shown in FIG. 1D, just after the creation of the first firmly bonded connection V1 and the visual inspection of the connection, the contact element 7 is attached to the now planar ring-shaped front side of the casing 6 by a second firmly bonded connection V2. The contact element 7 here is a copper or a copper alloy material, for example. The second firmly bonded connection V2 is formed by a friction stir welding method wherein the contact element 7 is rotated relative to the casing 6, until a weld joint is formed due to the plasticizing of the materials at the ring-shaped front side of the casing 6 and of the contact element 7. The contact element 7 here is depicted, for example, as a cable lug, but can also have any other design configuration. Thus, the finished line arrangement 1 is depicted in FIG. 1D.

FIGS. 2A to 2D illustrate an additional exemplary form of the production method for the line arrangement 1. The configuration of the line arrangement 1 produced in this manner corresponds essentially to that of the exemplary form described above. However, the production method differs due to its process steps.

Figure 2A:
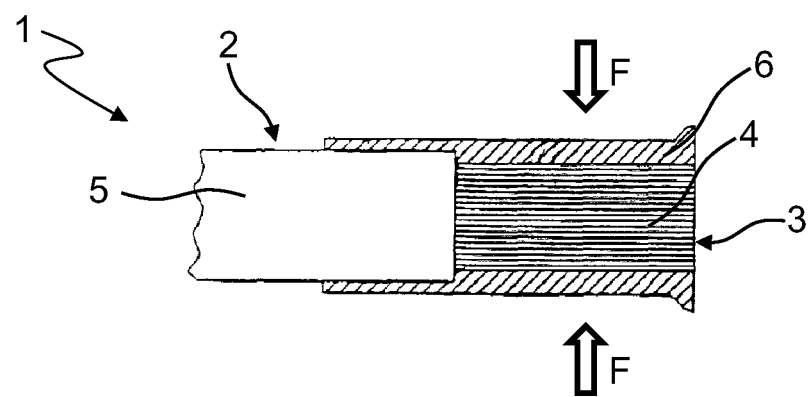
FIG. 2A is a side view of an electrical line arrangement which is produced according to a second exemplary form of the method according to the present disclosure.

Again in this exemplary example, the line 2 is prepared with exposed conductor 3, the casing 6 open on the front side is pushed thereon and the casing is pressed in a compressing tool (not illustrated) by a radial force F onto the conductor 3 and possibly also onto the insulating shell 5 (see FIG. 2A).

Figure 2B:
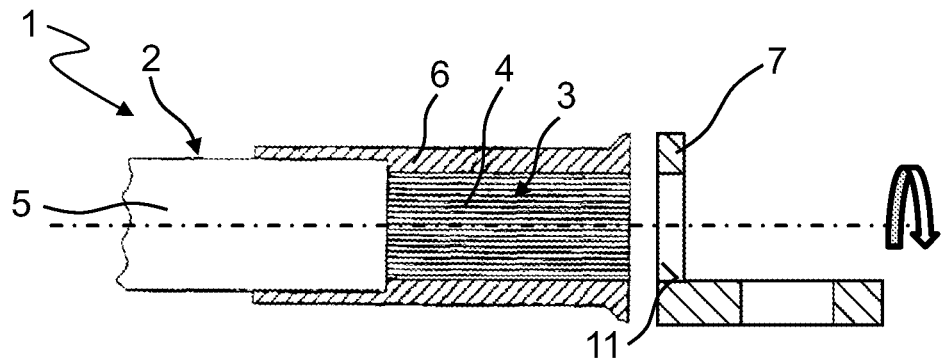
FIG. 2B is a side view of the electrical line arrangement of FIG. 2A adjacent to a contact element.

In contrast to the preceding exemplary form, however, first the contact element 7 is welded to the casing 6 to form a second firmly bonded connection V2 (see FIG. 2B). In this regard the contact element 7, designed here as a cable lug, for example, includes a passageway opening 11 in order to allow a visual inspection of the first firmly bonded connection V1 to be produced subsequently. The contact element 7 is rotated about a longitudinal axis of the line arrangement 1 and is thus secured by friction welding to the ring-shaped front side of the casing 6, that is, to its front surface.

Figure 2C:
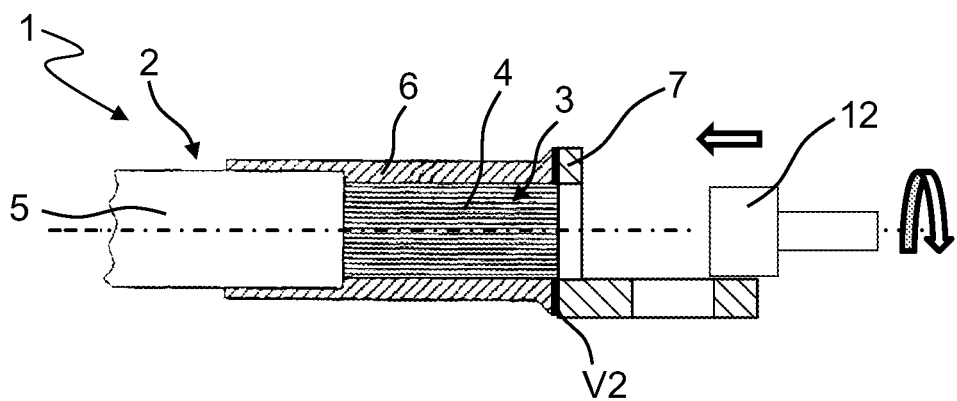
FIG. 2C is a side view of the electrical line arrangement of FIG. 2B with a firmly bonded contact element, adjacent to a pin-shaped reaming tool.

After formation of the second firmly bonded connection V2, the first firmly bonded connection V1 is then produced. As is indicated in FIG. 2C, a pin-shaped reaming tool 12 is inserted through the passageway opening 11 of the contact element 7, then guided farther up to the conductor 3 and is then rotated about the longitudinal axis of the line arrangement 1. Thus, the first firmly bonded connection V1 is likewise formed by friction stir welding.

Figure 2D:
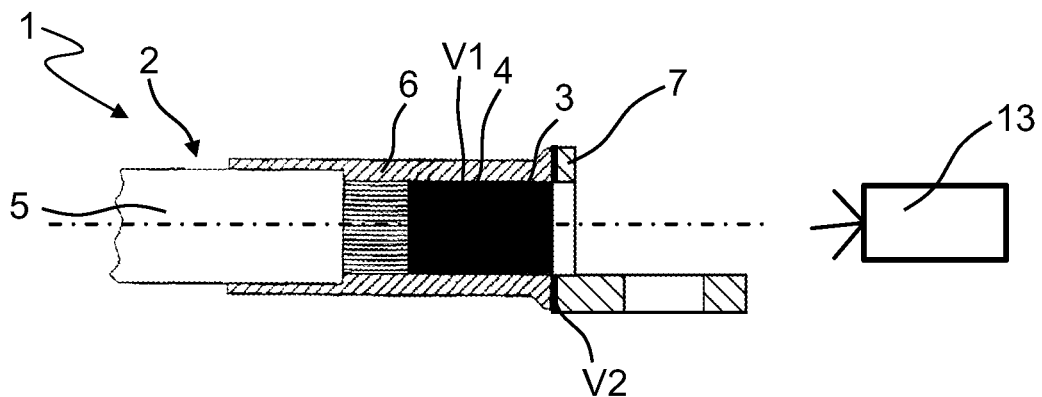
FIG. 2D is a side view of the electrical line arrangement of FIG. 2C with a firmly bonded connection adjacent to an inspection tool.

The finished line arrangement 1 is depicted in FIG. 2D. Now the first firmly bonded connection V1 can be visually inspected with the test apparatus 13 through the passageway opening 11 of the contact element 7.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for producing an electrical line arrangement with an exposed electrical conductor and an electrical contact element to be connected thereto, the method comprising:
   affixing a casing having two open front sides to the exposed electrical conductor;
   forming a first bonded connection between the exposed electrical conductor and an interior perimeter section of the casing by friction stir welding, wherein the friction stir welding includes introducing a reaming tool within one of the two open front sides of the casing to contact the exposed electrical conductor and rotating the reaming tool relative to the casing and the exposed electrical conductor; and
   forming a second bonded connection between the casing and the electrical contact element by rotary friction welding.

2. The method according to claim 1, wherein the first bonded connection is checked visually through the one of the two open sides of the casing after the casing is affixed to the exposed electrical conductor.

3. The method according to claim 1, wherein the second bonded connection is formed before forming the first bonded connection.

4. The method according to claim 3, wherein the electrical contact element includes a passageway opening for insertion of the reaming tool when forming the first bonded connection.

5. The method according to claim 1, wherein the second bonded connection is formed after the casing is affixed to the exposed electrical conductor.

6. The method according to claim 5, wherein when forming the first bonded connection, a tool contour of the reaming tool produces a facing on a ring-shaped front surface of the casing facing the electrical contact element.

7. The method according to claim 1, wherein the second bonded connection is produced by rotating the electrical contact element relative to the casing during the rotary friction welding.

8. The method according to claim 1, wherein the second bonded connection is formed between a ring-shaped front surface of the casing and an opposing surface of the electrical contact element.

9. The method according to claim 1, wherein the casing is pressed radially onto the exposed electrical conductor while being affixed.

10. The method according to claim 1, wherein the exposed electrical conductor is manufactured from aluminum or an aluminum alloy.

\* \* \* \* \*